United States Patent
Arakawa

(10) Patent No.: US 10,072,175 B2
(45) Date of Patent: Sep. 11, 2018

(54) GLASS PLATE SUBSTITUTE FILM, AND DISPLAY DEVICE

(71) Applicant: KEIWA, INC., Osaka (JP)

(72) Inventor: Akira Arakawa, Osaka (JP)

(73) Assignee: KEIWA INC., Osaka (JP)

( * ) Notice: Subject to any disclaimer, the term of this patent is extended or adjusted under 35 U.S.C. 154(b) by 0 days.

(21) Appl. No.: 15/007,691

(22) Filed: Jan. 27, 2016

(65) Prior Publication Data
US 2016/0215165 A1 Jul. 28, 2016

(30) Foreign Application Priority Data

Jan. 27, 2015 (JP) .................................. 2015-013779
Jan. 12, 2016 (JP) .................................. 2016-003944

(51) Int. Cl.
*C09D 163/00* (2006.01)
*C09D 5/24* (2006.01)
(Continued)

(52) U.S. Cl.
CPC .......... *C09D 163/00* (2013.01); *B32B 27/365* (2013.01); *C08G 64/0208* (2013.01);
(Continued)

(58) Field of Classification Search
CPC ..... Y10T 428/31507; Y10T 428/31518; Y10T 428/24479; Y10T 428/24521;
(Continued)

(56) References Cited

U.S. PATENT DOCUMENTS

2002/0197487 A1* 12/2002 Bier ........................ B32B 17/10
428/426
2009/0105393 A1 4/2009 Jansen et al.
(Continued)

FOREIGN PATENT DOCUMENTS

CN 102470657 A 5/2012
CN 102630234 A 8/2012
(Continued)

OTHER PUBLICATIONS

Translation of KR20040101595; published Dec. 3, 2004.*
Translation of KR20130008479; published Jan. 22, 2013.*

*Primary Examiner* — Catherine A. Simone
(74) *Attorney, Agent, or Firm* — Norris McLaughlin & Marcus, P.A.

(57) ABSTRACT

Provided is a glass plate substitute film having superior substitutability for glass plates due to having superior impact resistance and light weight compared with glass plates, as well as sufficient scratch-preventing property, blooming resistance and yellowing resistance. The glass plate substitute film of the present invention includes: a substrate layer; and one or a plurality of surface layers overlaid on one side or both two sides of the substrate layer, wherein the substrate layer contains as a principal component a polycarbonate having a constitutional unit derived from a dihydroxy compound represented by the following formula (1), and wherein the dihydroxy compound is an extract of a plant or a derivative thereof. At least one surface layer of the one or the plurality of surface layers preferably contains an active energy ray-curable resin as a principal component. The active energy ray-curable resin is preferably an ultraviolet ray-curable epoxy resin.

(Continued)

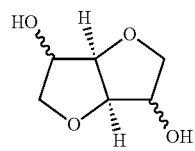

(1)

6 Claims, 9 Drawing Sheets

(51) Int. Cl.
 *B32B 27/36* (2006.01)
 *C08J 5/18* (2006.01)
 *C08G 64/02* (2006.01)

(52) U.S. Cl.
 CPC ...... *C08J 5/18* (2013.01); *C09D 5/24* (2013.01); *B32B 2369/00* (2013.01); *C08J 2369/00* (2013.01)

(58) Field of Classification Search
 CPC ....... Y10T 428/24529; Y10T 428/2457; Y10T 428/24355; B32B 17/06; B32B 17/064; B32B 17/10; B32B 17/10018; B32B 17/10036; B32B 27/365; B32B 2457/20; B32B 2457/202; B32B 2457/204; B32B 2457/206; B32B 2457/208; B32B 2369/00; C09D 163/00; C09D 5/24; C08J 5/18; C08J 2369/00; C08G 64/0208

See application file for complete search history.

(56) References Cited

U.S. PATENT DOCUMENTS

| | | |
|---|---|---|
| 2010/0184884 A1 | 7/2010 | Miyake et al. |
| 2011/0123774 A1* | 5/2011 | Matsui ............... G02B 27/0006 428/172 |
| 2011/0160422 A1 | 6/2011 | Kamps et al. |
| 2012/0164444 A1 | 6/2012 | Kinoshita |
| 2012/0308796 A1 | 12/2012 | Tanaka et al. |
| 2012/0328855 A1 | 12/2012 | Yokogi et al. |
| 2014/0268334 A1 | 9/2014 | Tanaka et al. |

FOREIGN PATENT DOCUMENTS

| | | |
|---|---|---|
| CN | 102762380 A | 10/2012 |
| CN | 102922806 A | 2/2013 |
| EP | 2543510 A1 | 1/2013 |
| JP | 10-292163 | 11/1998 |
| JP | 2008-181100 A | 7/2008 |
| JP | 2009-079191 | 4/2009 |
| JP | 2011-209695 | 10/2011 |
| JP | 4839285 B2 | 10/2011 |
| KR | 2004-0101595 | 12/2004 |
| KR | 10-2012-0056826 A | 6/2012 |
| KR | 10-2013-0008479 A | 1/2013 |
| TW | 201331039 A1 | 8/2013 |
| WO | 2007/013463 A1 | 2/2007 |

* cited by examiner

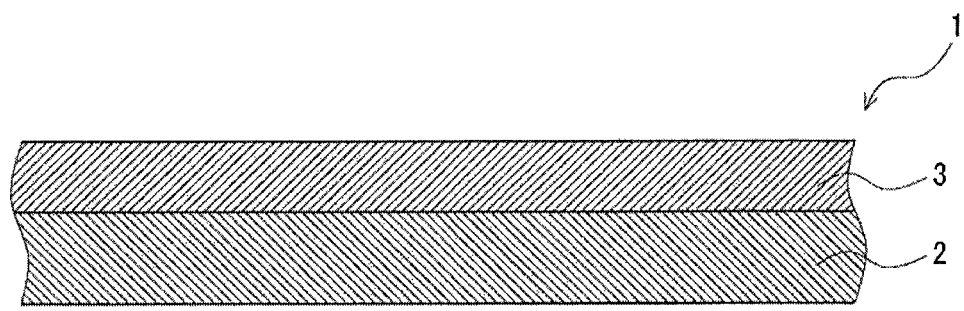
F I G. 1

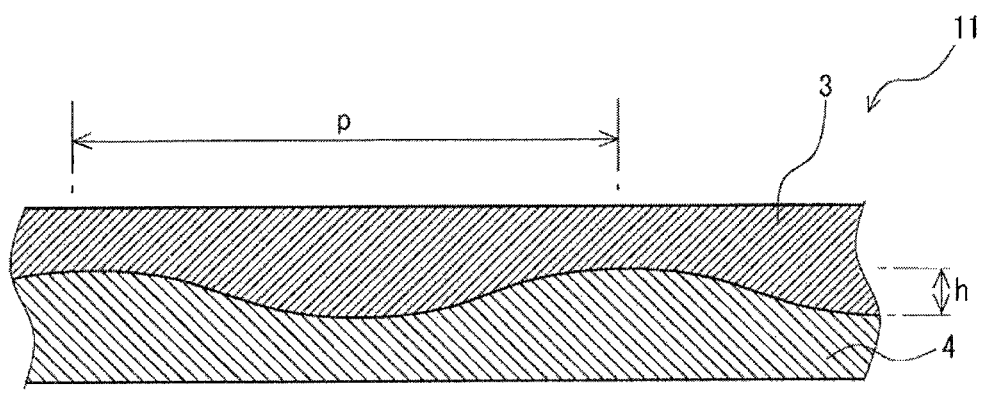
F I G. 2

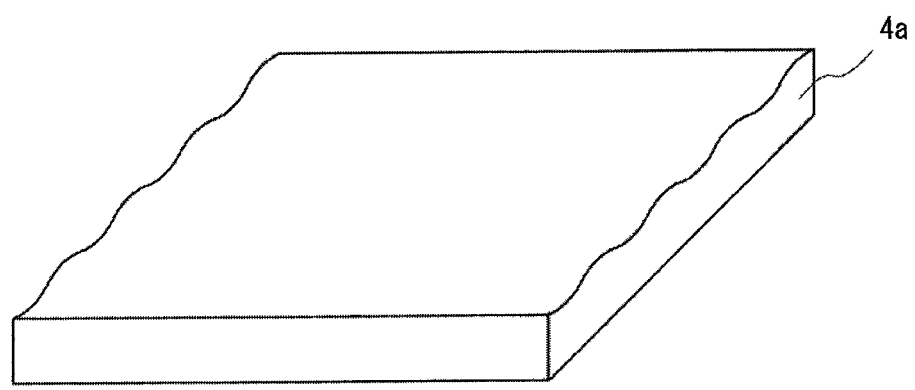
F I G. 3

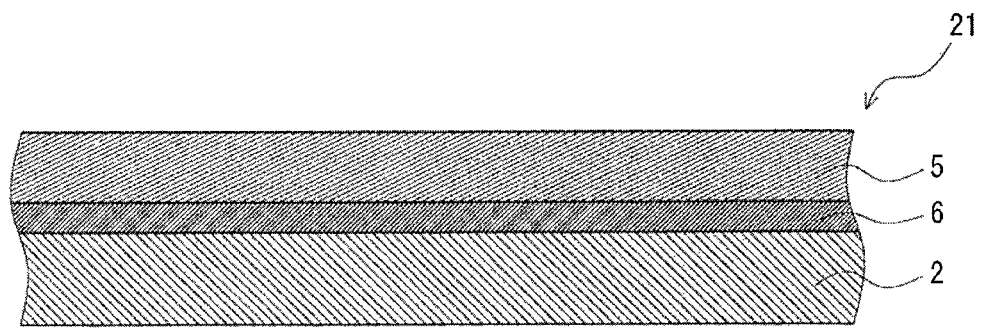
F I G. 4

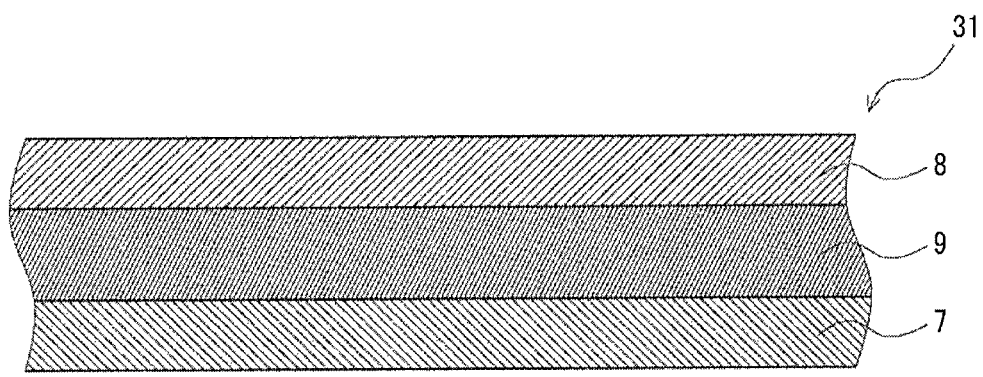
F I G. 5

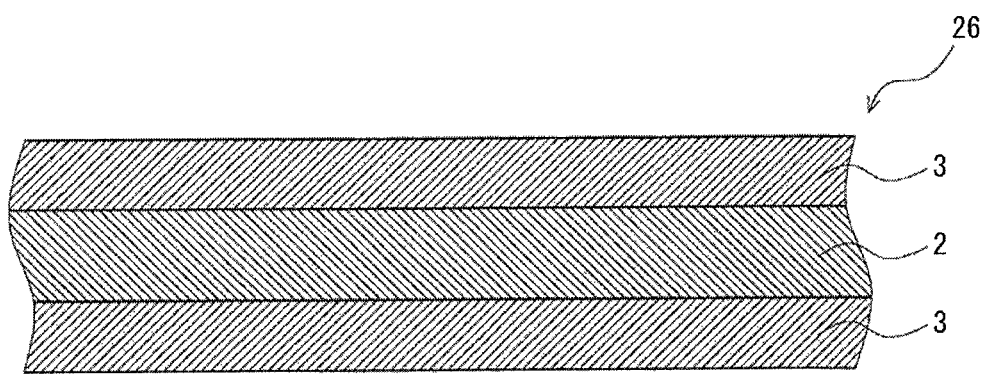
F I G. 6

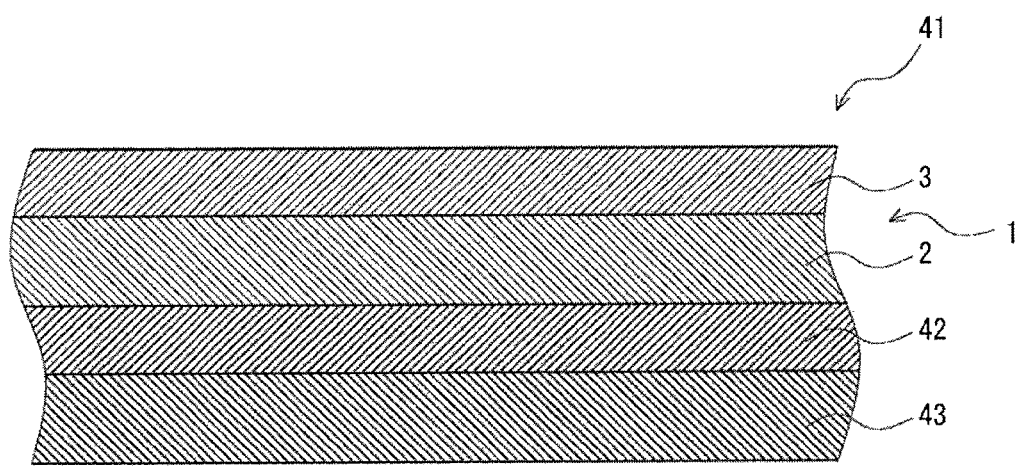
F I G. 7

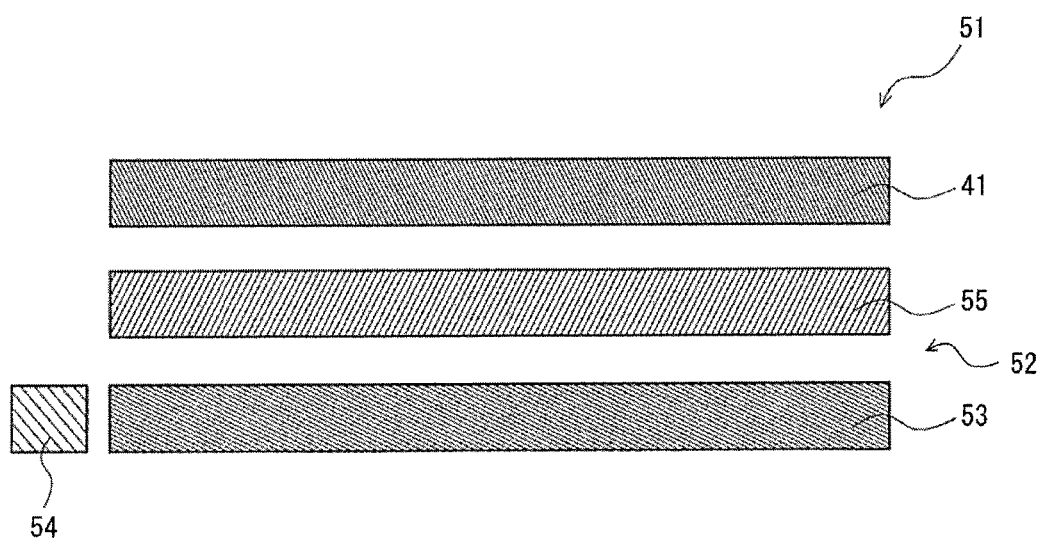
F I G. 8

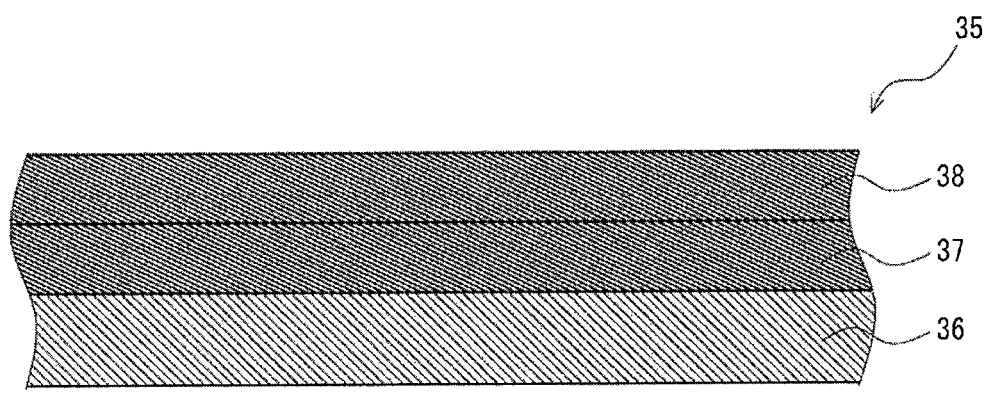
F I G. 9

GLASS PLATE SUBSTITUTE FILM, AND DISPLAY DEVICE

BACKGROUND OF THE INVENTION

The present invention relates to a glass plate substitute film, and a display device.

Conventionally, glass plates have been employed as a flat panel display, a front plate for display devices of portable terminals and the like (see Japanese Unexamined Patent Application, Publication No. 2011-209695). Such glass plates are provided for the purpose of, e.g., enhancing the strength of the front face side of display panels.

However, glass plates are generally fragile, and thus are likely to be broken when impact is applied thereon. In particular, reduction in thickness is strongly demanded for display devices and the like, and glass plates having a reduced thickness to meet such demands are even more likely to be broken. Therefore, when a glass plate is used as the front plate as described above, a protection film is frequently attached on the surface of the front plate in order to prevent the breakage. In addition, glass plates are inferior in handleability since they are comparatively heavy in weight.

PRIOR ART DOCUMENT

Patent Document 1: Japanese Unexamined Patent Application, Publication No. 2011-209695

SUMMARY OF THE INVENTION

The present invention was made in view of the foregoing circumstances, and an object of the present invention is to provide a glass plate substitute film having superior substitutability for glass plates due to having superior impact resistance and light weight compared with glass plates, as well as sufficient scratch-preventing property, blooming resistance and yellowing resistance, and to provide a display device in which the glass plate substitute film is used.

Means for Solving the Problems

The glass plate substitute film according to an aspect of the present invention made for solving the aforementioned problems includes: a substrate layer; and one or a plurality of surface layers overlaid on one side or both two sides of the substrate layer, wherein the substrate layer contains as a principal component a polycarbonate having a constitutional unit derived from a dihydroxy compound represented by the following formula (1), and wherein the dihydroxy compound is an extract of a plant or a derivative thereof.

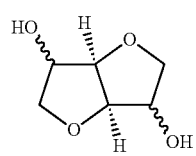

(1)

In the glass plate substitute film, since the substrate layer contains as a principal component the polycarbonate having a constitutional unit derived from a dihydroxy compound represented by the above formula (1), reduction in weight can be achieved when used in place of a conventional glass plate. In addition, since the substrate layer contains a certain polycarbonate as a principal component in the glass plate substitute film as described above, superior impact resistance is achieved, and therefore, breakage upon application of the impact is less likely to occur as compared with conventional glass plates. Therefore, a necessity for pasting the protection film in order to prevent the breakage as executed on the surface of conventional glass plates can be obviated. In addition, according to the glass plate substitute film, since the surface layer is overlaid on one side or both two sides of the substrate layer, the surface layer can protect the substrate layer from being scratched.

In addition, the principal component of the substrate layer is the polycarbonate having a constitutional unit derived from a dihydroxy compound represented by the above formula (1), and the dihydroxy compound is the extract of a plant or the derivative thereof in the glass plate substitute; therefore, blooming resistance and/or yellowing resistance against ultraviolet rays can be improved to enable the transparency to be maintained, as compared with films originated from a petroleum resource (film provided using a raw material derived from a petroleum resource). Thus, the glass plate substitute film is superior in substitutability for a glass plate. Furthermore, the glass plate substitute film can improve solvent resistance, resistance to sunscreen, flame retardance and the like as compared with films originated from a petroleum resource. Moreover, although incineration of the film originated from a petroleum resource may lead to environmental destruction and thus requires a complicated disposal procedure, the present glass plate substitute film can be easily disposed since the dihydroxy compound is an extract of a plant or a derivative thereof.

It is preferred that at least one surface layer of the one or the plurality of surface layers contains an active energy ray-curable resin as a principal component. When the principal component of the surface layer is thus an active energy ray-curable resin, the surface layer can be easily and certainly formed.

The active energy ray-curable resin is preferably an ultraviolet ray-curable epoxy resin. Owing to a small volumetric reduction rate during hardening, the ultraviolet ray-curable epoxy resin enables the occurrence of curling of the substrate layer and the occurrence of cracking of the surface layer to be accurately inhibited when the surface layer is formed, whereby the surface layer can be more easily and certainly formed.

It is preferred that the at least one surface layer of the one or the plurality of surface layers is mainly composed of glass. Accordingly, while the impact resistance becomes superior compared with conventional glass plates as described above, scuff resistance comparable to conventional glass can be attained since the surface layer is mainly composed of glass.

It is preferred that the polycarbonate further has a constitutional unit derived from an aliphatic dihydroxy compound other than the dihydroxy compound. In other words, the polycarbonate contained in the substrate layer as a principal component preferably has a constitutional unit derived from the dihydroxy compound represented by the above formula (1) (hereinafter, may be also referred to as "first constitutional unit"), and a constitutional unit derived from an aliphatic dihydroxy compound other than the dihydroxy compound (hereinafter, may be also referred to as "second constitutional unit"). When the polycarbonate contained in the substrate layer as a principal component includes not only the first constitutional unit but also the second constitutional unit, flexibility, heat resistance, formability, yellowing resistance against ultraviolet rays, flame retardance and the like can be improved as compared with the case in which the second constitutional unit is not contained.

It is preferred that an electrically conductive layer that is provided between the substrate layer and the at least one surface layer of the one or the plurality of surface layers, and contains an electrically conductive inorganic material as a principal component is further included. When an electrically conductive layer that is additionally provided between the substrate layer and the at least one surface layer of the one or the plurality of surface layers, and that contains an electrically conductive inorganic material as a principal component is thus included, an antistatic property can be improved.

The substrate layer preferably has a wavy and fine modulated structure on one side face or both two side faces. Accordingly, when another layer is overlaid on the face(s) on one side or both two sides having the wavy and fine modulated structure, the fine modulated structure results in an increase of a contact area of the substrate layer and the other layer, whereby adhesion strength between the substrate layer and the other layer can be improved.

The glass plate substitute film is preferably used as a front plate of a display device. When the glass plate substitute film is thus used as a front plate of a display device, the impact resistance and lightweight properties of the front plate are improved as compared with conventional glass plates, and the scratch-preventing property, blooming resistance and yellowing resistance of the front plate can be improved.

Furthermore, the display device according to another aspect of the present invention includes the glass plate substitute film having the configuration described above.

Since the display device includes the glass plate substitute film as the front plate, the impact resistance and lightweight properties of the front plate are improved as compared with conventional glass plates, and the scratch-preventing property, blooming resistance and yellowing resistance of the front plate can be improved.

It is to be noted that the term "principal component" as referred to herein means a component included at the greatest content, and for example, a component included at a content of no less than 50% by mass. Further, the phrase "mainly composed of glass" as referred to means that the content of glass is no less than 50% by volume.

Effects of the Invention

As explained in the foregoing, the glass plate substitute film according to the aspect of the present invention has superior substitutability for glass plates due to having superior impact resistance and light weight compared with glass plates, as well as sufficient scratch-preventing property, blooming resistance and yellowing resistance. In addition, the display device according to the another aspect of the present invention allows the impact resistance and lightweight properties of the front plate to be improved as compared with glass plates, and the scratch-preventing property, blooming resistance and yellowing resistance of the front plate can be improved.

BRIEF DESCRIPTION OF THE DRAWINGS

FIG. 1 shows a schematic cross sectional view illustrating a glass plate substitute film according to an embodiment of the present invention;

FIG. 2 shows a schematic cross sectional view illustrating a glass plate substitute film according to an embodiment that is different from the glass plate substitute film shown in FIG. 1;

FIG. 3 shows a schematic perspective view illustrating a base film formed by a substrate layer-forming step in a production method of the glass plate substitute film shown in FIG. 2;

FIG. 4 shows a schematic cross sectional view illustrating a glass plate substitute film according to an embodiment that is different from the glass plate substitute films shown in FIG. 1 and FIG. 2;

FIG. 5 shows a schematic cross sectional view illustrating a glass plate substitute film according to an embodiment that is different from the glass plate substitute films shown in FIGS. 1, 2 and 4;

FIG. 6 shows a schematic cross sectional view illustrating a glass plate substitute film according to an embodiment that is different from the glass plate substitute films shown in FIGS. 1, 2, 4 and 5;

FIG. 7 shows a schematic cross sectional view illustrating a panel laminate for a display device that includes the glass plate substitute film shown in FIG. 1; and FIG. 8 shows a schematic cross sectional view illustrating a display device that includes the panel laminate for a display device shown in FIG. 7; and FIG. 9 shows a schematic cross sectional view illustrating a glass plate substitute film according to an embodiment that is different from the glass plate substitute films shown in FIGS. 1, 2, 4, 5 and 6.

DESCRIPTION OF THE PREFERRED EMBODIMENTS

Hereinafter, preferred modes for carrying out the invention are described in detail with appropriate references to the drawings.

First Embodiment

Glass Plate Substitute Film

The glass plate substitute film 1 shown in FIG. 1 includes a substrate layer 2, and a surface layer 3 overlaid on one side of the substrate layer 2. The glass plate substitute film 1 shown in FIG. 1 is formed as a two-layer structure including the substrate layer 2 and the surface layer 3. The glass plate substitute film 1 shown in FIG. 1 is transparent. The glass plate substitute film 1 shown in FIG. 1 is flexible. The glass plate substitute film 1 shown in FIG. 1 is used as a substitute for conventional glass plates. It is to be noted that each figure herein shows a schematic view and the dimension and the like may differ from actual one.

The lower limit of the average thickness of the glass plate substitute film 1 is preferably 120 µm, more preferably 300 µm, and still more preferably 400 µm. On the other hand, the upper limit of the average thickness of the glass plate substitute film 1 is preferably 1,040 µm, more preferably 800 µm, and still more preferably 600 µm. When the average thickness of the glass plate substitute film 1 is less than the lower limit, sufficient impact resistance and scratch-preventing property may not be attained. To the contrary, when the average thickness of the glass plate substitute film 1 is greater than the upper limit, demands for reduction in thickness may not be satisfied.

Substrate Layer

The substrate layer 2 is formed to be transparent, and more preferably colorless transparent. Moreover, the substrate layer 2 has flexibility. The substrate layer 2 has impact resistance, and supports the surface layer 3 from other side. The substrate layer 2 contains as a principal component, a polycarbonate having a constitutional unit (first constitutional unit) derived from a dihydroxy compound represented by the following formula (1). The lower limit of the content of the polycarbonate having the first constitutional unit in the entire resin component of the substrate layer 2 is preferably 80% by mass, more preferably 90% by mass, and still more preferably 98% by mass. Moreover, the upper limit of the content of the polycarbonate having the first constitutional unit derived from a dihydroxy compound in the entire resin component of the substrate layer 2 may be, for example, 100% by mass.

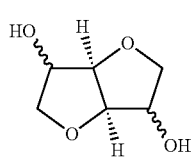

(1)

The dihydroxy compound represented by the above formula (1) is an extract of a plant or a derivative thereof. The dihydroxy compound represented by the above formula (1) is exemplified by isosorbide, isomannide, and isoidet, which may be used either alone, or in combination of two or more thereof. Of these, isosorbide obtained by dehydrative condensation of sorbitol which can be produced from various starches abundantly present as resources is preferred. The polycarbonate that forms the substrate layer 2 may be produced by, for example, a melt polymerization process from the dihydroxy compound represented by the above formula (1) and a carbonate diester.

In addition, it is preferred that the polycarbonate further has a constitutional unit derived from an aliphatic dihydroxy compound other than the dihydroxy compound represented by the above formula (1) (second constitutional unit). The aliphatic dihydroxy compound is exemplified by a linear aliphatic dihydroxy compound, an alicyclic dihydroxy compound or an aromatic dihydroxy compound. In the glass plate substitute film 1, when the polycarbonate contained in the substrate layer 2 as a principal component has not only the first constitutional unit but also the second constitutional unit, flexibility, heat resistance, formability, yellowing resistance against ultraviolet rays, flame retardance and the like can be improved in comparison with the case in which the second constitutional unit is not included.

Examples of the linear aliphatic dihydroxy compound include ethylene glycol, propanediols such as 1,2-propanediol and 1,3-propanediol, butanediols such as 1,2-butanediol, 1,3-butanediol and 1,4-butanediol, pentanediols such as 1,5-pentanediol, hexanediols such as 1,4-hexanediol and 1,6-hexanediol, heptanediols such as 1,7-heptanediol, octanediols such as 1,8-octanediol, decanediols such as 1,10-decanediol, dodecanediols such as 1,12-dodecanediol, and the like. Among these, 1,3-propanediol, 1,4-butanediol, 1,6-hexanediol or 1,10-decanediol is preferred.

Although the alicyclic dihydroxy compound is not particularly limited, the alicyclic dihydroxy compound preferably includes a five-membered ring structure or a six-membered ring structure. When the alicyclic dihydroxy compound that includes a five-membered structure or a six-membered structure is used, heat resistance can be improved. In addition, the six-membered structure may have a fixed conformation of a chair form or boat form by covalent bonding. The upper limit of the number of carbon atoms included in the alicyclic dihydroxy compound is preferably 70, more preferably 50, and still more preferably 30. When the number of carbon atoms included in the alicyclic dihydroxy compound is greater than the upper limit, the heat resistance can be improved; however the synthesis, purification and the like may be difficult. On the other hand, the lower limit of the carbon atoms included in the alicyclic dihydroxy compound may be, for example, 5.

Examples of the aromatic dihydroxy compound include: bis(hydroxyaryl)alkanes such as 2,2-bis(4-hydroxyphenyl) propane (may be also referred to as "bisphenol A"), 2,2-bis (3,5-dibromo-4-hydroxyphenyl)propane (may be also referred to as "tetrabromobisphenol A"), bis(4-hydroxyphenyl)methane, 1,1-bis(4-hydroxyphenyl)ethane, 2,2-bis(4-hydroxyphenyl)butane, 3,3',5,5'-tetramethyl-4,4'-dihydroxybiphenyl, 2,2-bis(4-hydroxyphenyl)octane, 2,2-bis(4-hydroxy-3-t-butylphenyl)propane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 4,4-bis(4-hydroxyphenyl)heptane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane and 2,2-bis(4-hydroxyphenyl)-1,1,1,3,3,3-hexafluoropropane; bis(hydroxyaryl)cycloalkanes such as 1,1-bis(4-hydroxyphenyl)cyclopentane, 1,1-bis(4-hydroxyphenyl)cyclohexane and 1,1-bis(4-hydroxyphenyl)-3,3,5-trimethylcyclohexane; dihydroxydiaryl ethers such as 4,4'-dihydroxydiphenyl ether and 4,4'-dihydroxy-3,3'-dimethyldiphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; hydroquinone, resorcin, 4,4'-dihydroxydiphenyl, bis(4-hydroxyphenyl) ketone; and the like. Of these, bis(4-hydroxyphenyl)alkanes are preferred, and 2,2-bis(4-hydroxyphenyl)propane ("bisphenol A") is particularly preferred in light of the impact resistance.

The lower limit of the content of the dihydroxy compound represented by the above formula (1) with respect to the entire dihydroxy compound forming the polycarbonate that constitutes the substrate layer 2 is preferably 10 mol %, more preferably 30 mol %, and still more preferably 50 mol %. On the other hand, the upper limit of the content of the dihydroxy compound represented by the above formula (1) with respect to the entire dihydroxy compound is preferably 90 mol %, and more preferably 80 mol %. When the content of the dihydroxy compound represented by the above formula (1) falls within the above range, scuff resistance, transparency, flexibility, heat resistance, formability, yellowing resistance against ultraviolet rays, flame retardance and the like can be accurately improved.

Furthermore, when the substrate layer 2 contains as the constitutional unit of the polycarbonate, the dihydroxy compound represented by the above formula (1) and the aforementioned alicyclic dihydroxy compound, the total content of the dihydroxy compound represented by the above formula (1) and the alicyclic dihydroxy compound with respect to the entire dihydroxy compound is not particularly limited, and preferably no less than 70 mol %, more preferably no less than 80 mol, and still more preferably no less than 90 mol %.

The reaction temperature is preferably a comparatively low temperature in light of an inhibition of the degradation of the dihydroxy compound, and an acquisition of a resin having high transparency and high viscosity. The lower limit of the polymerization temperature for allowing the polymerization reaction to suitably proceed is preferably 180° C. On the other hand, the upper limit of the polymerization temperature is preferably 280° C., and more preferably 260° C.

Moreover, a method is preferred in which at an initial stage of the reaction, the dihydroxy compound and the carbonate diester are heated at an ordinary pressure to allow for a preliminary reaction, and then the pressure is gradually reduced to give the reaction system having a reduced pressure of about no less than $1.3 \times 10^{-3}$ MPa and no greater than $1.3 \times 10^{-5}$ MPa at an later stage of the reaction to facilitate the distillation off of thus produced alcohol or phenol. The reaction time period is preferably no less than 0.5 hrs and no greater than 4 hrs.

Examples of the carbonate diester include carbonic dialkyl compounds such as dimethyl carbonate, diethyl carbonate and di-tert-butyl carbonate, diphenyl carbonate, substituted diphenyl carbonates such as ditolyl carbonate, and the like. Of these, diphenyl carbonate or substituted diphenyl carbonate is preferred, and in particular, diphenyl carbonate is preferred in terms of a favorable reactivity, leading to a cost reduction.

The lower limit of the ratio (molar ratio) of mixing of the carbonate diester to the dihydroxy compound is preferably 0.98, and more preferably 0.99. On the other hand, the upper limit of the ratio (molar ratio) of mixing of the carbonate diester to the dihydroxy compound is preferably 1.02, and more preferably 1.01. When the ratio of mixing of the carbonate diester to the dihydroxy compound is less than the lower limit, a sufficient degree of polymerization may not be attained. To the contrary, when the ratio of mixing of the carbonate diester to the dihydroxy compound is greater than the upper limit, the carbonate ester residue serves in end capping, and consequently a sufficient degree of polymerization may not be attained.

Examples of a polymerization catalyst include: alkali metal compounds such as sodium hydroxide, potassium hydroxide, lithium hydroxide, cesium hydroxide, sodium carbonate, potassium carbonate, lithium carbonate, cesium carbonate, sodium hydrogen carbonate, potassium hydrogen carbonate, lithium hydrogen carbonate, cesium hydrogen carbonate, sodium acetate, potassium acetate, lithium acetate and cesium acetate; alkaline earth metal compounds such as calcium hydroxide, barium hydroxide, magnesium hydroxide, calcium hydrogen carbonate, barium hydrogen carbonate, magnesium hydrogen carbonate, calcium acetate, barium acetate and magnesium acetate; and the like. In addition, as the polymerization catalyst, a nitrogen-containing basic compound such as tetramethylammonium hydroxide, tetraethylammonium hydroxide, tetrabutylammonium hydroxide, trimethylamine or triethylamine is preferably used in combination with the alkali metal compound and/or the alkaline earth metal compound.

The lower limit of the amount of the polymerization catalyst used is preferably $1 \times 10^{-3}$ equivalent, and more preferably $1 \times 10^{-8}$ equivalent with respect to 1 mol of the carbonate diester component. On the other hand, the upper limit of the amount of the polymerization catalyst used is preferably $1 \times 10^{-3}$ equivalent, and more preferably $5 \times 10^{-4}$ equivalent with respect to 1 mol of the carbonate diester component. In addition, the reaction system is preferably maintained in an atmosphere of an inert gas such as nitrogen for the raw materials, the reaction mixture, and the reaction product. Exemplary inert gas other than nitrogen includes argon and the like.

To the substrate layer 2 may be added various types of additives as needed. Exemplary additives may include an antioxidant, an antistatic agent, a fire retardant, a heat stabilizer, an ultraviolet ray-absorbing agent, a mildewproofing agent, a plasticizer, a tackifier, a reinforcing agent, a lubricant, and the like.

The antioxidant is exemplified by a phenolic antioxidant, a phosphorus-based antioxidant, a sulfur-based antioxidant, a heat-resistant processing stabilizer, an oxygen scavenger and the like, and of these, a phenolic antioxidant is preferred and an alkyl-substituted phenolic antioxidant is particularly preferred. By blending at least one of these antioxidants, impairment of the strength and/or coloring of the formed product resulting from heating and/or oxidative degradation, etc., during the formation can be prevented without deteriorating the transparency, the heat resistance and the like. The lower limit of the content of the antioxidant is preferably 0.001% by mass, and more preferably 0.005% by mass. On the other hand, the upper limit of the content of the antioxidant is preferably 5% by mass, and more preferably 1% by mass.

Examples of the antistatic agent include: anionic antistatic agents such as an alkylsulfuric acid salt and an alkylphosphoric acid salt; cationic antistatic agents such as a quaternary ammonium salt and an imidazoline compound; non-ionic antistatic agents such as a polyethylene glycol-based antistatic agent, a polyoxyethylene sorbitan monostearic acid ester and an ethanolamide; polymeric antistatic agents such as a polyacrylic acid; and the like. Of these, cationic antistatic agents having a comparatively great antistatic effect are preferred, which exert the antistatic effect by adding in a small amount.

The lower limit of the glass transition temperature (Tg) of the polycarbonate constituting the substrate layer 2 is preferably 80° C., and more preferably 90° C. On the other hand, the upper limit of the glass transition temperature (Tg) of the polycarbonate constituting the substrate layer 2 is preferably 170° C., and more preferably 160° C. When the glass transition temperature (Tg) is less than the lower limit, the heat resistance of the substrate layer 2 may be insufficient. To the contrary, when the glass transition temperature (Tg) is greater than the upper limit, the melt fluidity in extrusion forming of a base film as described later may be impaired.

The lower limit of the 5% thermal weight loss temperature of the polycarbonate for forming the substrate layer 2 is preferably 340° C., and more preferably 350° C. When the 5% thermal weight loss temperature of the polycarbonate for forming the substrate layer 2 is less than the lower limit, the thermal stability is deteriorated, whereby usability at a high temperature may be impaired. It is to be noted that a process for elevating the 5% thermal weight loss temperature involves, for example, use of the alkali metal compound in combination with a nitrogen-containing basic compound, as the polymerization catalyst.

The substrate layer 2 preferably has an inorganic oxide which was vapor deposited on one side face thereof. When the inorganic oxide is vapor deposited on one side face of the substrate layer 2, the hardness of the one side face of the substrate layer 2 increases, whereby the scratch-preventing property of the one side face of the glass plate substitute film 1 can be improved.

The process for vapor deposition of such an inorganic oxide is not particularly limited as long as the inorganic oxide can be vapor-deposited without causing any deterioration such as contraction of the substrate layer 2, and for example, (a) physical vapor deposition methods (PVD method) such as a vacuum deposition method, a sputtering method, an ion plating method and an ion cluster beam method, and (b) chemical vapor deposition methods (CVD method) such as a plasma chemical vapor deposition method, a heat chemical vapor deposition method and a photochemical vapor deposition method may be exemplified. Among these vapor deposition methods, a vacuum deposition method and an ion plating method capable of forming the substrate layer 2 having superior quality with favorable productivity are preferred.

The inorganic oxide is not particularly limited as long as the hardness of one side face of the substrate layer 2 can be increased, and examples of the inorganic oxide include titanium oxide, zinc oxide, iron oxide, cerium oxide, silica, barium sulfate, aluminum hydroxide, magnesium hydroxide, calcium carbonate, magnesium carbonate, boron nitride, aluminum borate, barium titanate, strontium titanate, calcium titanate, magnesium titanate, bismuth titanate, barium zirconate, calcium zirconate, talc, clay, mica, boehmite, zeolite, apatite, kaolin, mullite, spinel, olivine, sericite, bentonite, hydrotalcite, and the like.

The upper limit of the mean particle diameter of the inorganic oxide is preferably 3 µm, more preferably 1 µm, and still more preferably 500 nm in light of the transparency and the like. On the other hand, the lower limit of the mean particle diameter of the inorganic oxide may be, for example, 50 nm.

The lower limit of the average thickness of the substrate layer 2 is preferably 100 µm, more preferably 200 µm, and still more preferably 300 µm. On the other hand, the upper limit of the average thickness of the substrate layer 2 is preferably 1,000 µm, more preferably 800 µm, and still more preferably 600 µm. When the average thickness of the substrate layer 2 is less than the lower limit, sufficient impact resistance is not attained, whereby use as, for example, a front plate of a display device may be difficult. To the contrary, when the average thickness of the substrate layer 2 is greater than the upper limit, the thickness is unnecessarily great, and therefore demands for reduction in thickness may not be satisfied.

The upper limit of the in-plane retardation Re of the substrate layer 2 as determined with light (sodium D line) at a wavelength of 589 nm is preferably 50 nm, more preferably 40 nm, and still more preferably 30 nm. When the upper limit of the retardation value Re is greater than the upper limit, visibility may be impaired through the change of the optical characteristics of rays of light. It is to be noted that the lower limit of the in-plane retardation value Re of the substrate layer 2 may be, for example, 0 nm.

Surface Layer

The surface layer 3 prevents one side of the substrate layer 2 from being scratched. The surface layer 3 corresponds to the outermost layer of the glass plate substitute film 1. The surface layer 3 is formed as a hard coat layer provided from a curable resin included as a principal component. The surface layer 3 is provided from a curable resin composition applied on one side face of the substrate layer 2. The curable resin which may be used as a principal component of the surface layer 3 is not particularly limited, and for example, a thermosetting resin and/or an active energy ray-curable resin, etc., may be included.

The thermosetting resin is exemplified by an epoxy resin, a silicone resin, a phenol resin, a urea resin, an unsaturated polyester resin, a melamine resin, an alkyd resin, a polyimide resin, an acrylic resin, an amide functional copolymer, a urethane resin, and the like.

The active energy ray-curable resin as referred to means a resin that is crosslinked and cured by the irradiation with an ultraviolet ray, an electron beam or the like, and the active energy ray-curable resin can be used through appropriately selecting from among polymerizable monomers and polymerizable oligomers. Further, the polymerizable monomer is exemplified by (meth)acrylate monomers, whereas the polymerizable oligomer is exemplified by (meth)acrylate oligomers. When the glass plate substitute film 1 includes the active energy ray-curable resin as a principal component of the surface layer 3, the scratch-preventing property on one side can be improved, whereby the necessity for separately overlaying a film for prevention of the scratch on the external surface of the surface layer 3 can be obviated. In other words, as for conventional glass plates, other film is commonly attached in order to prevent the breakage and the like; however, the glass plate substitute film 1 does not necessitate the attachment of such other film. Since the attachment of the other protection film or the like is not required according to the glass plate substitute film 1 unlike conventional glass plates, an inconvenience of generation of bubbles between the glass plate and the protection film upon the attachment as for the conventional glass plates can be precluded.

As the polymerizable monomer, a (meth)acrylate monomer having a radical polymerizable unsaturated group in its molecule is suitably used, and in particular, a polyfunctional (meth)acrylate is preferred. The polyfunctional (meth)acrylate is not particularly limited as long as it is a (meth)acrylate having at least two ethylenic unsaturated bonds in its molecule. Specifically, ethylene glycol di(meth)acrylate, propylene glycol di(meth)acrylate, 1,4-butanediol di(meth)acrylate, 1,6-hexanediol di(meth)acrylate, neopentyl glycol di(meth)acrylate, polyethylene glycol di(meth)acrylate, hydroxypivalate neopentylglycol di(meth)acrylate, dicyclopentanyl di(meth)acrylate, caprolactone modified dicyclopentenyl di(meth)acrylate, ethylene oxide modified phosphate di(meth)acrylate, allylated cyclohexyl di(meth) acrylate, isocyanurate di(meth)acrylate, trimethylolpropane tri(meth)acrylate, ethylene oxide modified trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, tris(acryloxyethyl)isocyanurate, propionic acid modified dipentaerythritol penta (meth)acrylate, dipentaerythritol hexa(meth)acrylate, ethylene oxide modified dipentaerythritol hexa(meth)acrylate, caprolactone modified dipentaerythritol hexa(meth)acrylate, and the like are exemplified. These polyfunctional (meth) acrylates may be used alone, or in combination of two or more thereof. Of these, dipentaerythritol tri(meth)acrylate is preferred.

Furthermore, in addition to the polyfunctional (meth) acrylate, a monofunctional (meth)acrylate may be further included for the purpose of e.g., decreasing the viscosity. Examples of the monofunctional (meth)acrylate include methyl (meth)acrylate, ethyl (meth)acrylate, propyl (meth) acrylate, butyl (meth)acrylate, pentyl (meth)acrylate, hexyl (meth)acrylate, cyclohexyl (meth)acrylate, 2-ethylhexyl (meth)acrylate, lauryl (meth)acrylate, stearyl (meth)acrylate, isobornyl (meth)acrylate, and the like. These monofunctional (meth)acrylates may be used alone, or in combination of two or more thereof.

As the polymerizable oligomer, an oligomer having a radical polymerizable unsaturated group in its molecule is exemplified, and for example, an epoxy (meth)acrylate oligomer, a urethane (meth)acrylate oligomer, a polyester (meth)acrylate oligomer, a polyether (meth)acrylate oligomer and the like may be included.

The epoxy (meth)acrylate oligomer may be obtained by reacting, for example, an oxirane ring of a bisphenol epoxy resin or novolac epoxy resin having a comparatively low molecular weight with a (meth)acrylic acid to permit esterification. Alternatively, a carboxyl modified epoxy (meth)acrylate oligomer may be also used which is obtained by partially modifying the epoxy (meth)acrylate oligomer with a dibasic carboxylic anhydride. The urethane (meth)acrylate oligomer may be obtained by, for example, esterifying with a (meth)acrylic acid, a polyurethane oligomer obtained by a reaction of a polyether polyol and/or a polyester polyol with a polyisocyanate. The polyester (meth)acrylate oligomer may be obtained by, for example, esterifying with a (meth)acrylic acid, hydroxyl groups of a polyester oligomer having hydroxyl groups at both two ends obtained by condensation of a polyhydric carboxylic acid with a polyhydric alcohol. Alternatively, it is also possible to obtain the polyester (meth)acrylate oligomer by esterifying with a (meth)acrylic acid, hydroxyl groups at ends of an oligomer obtained by allowing an alkylene oxide to react with a polyhydric carboxylic acid. The polyether (meth)acrylate oligomer may be obtained by esterifying with a (meth)acrylic acid, hydroxyl groups of a polyether polyol.

Also, as the active energy ray-curable resin, an ultraviolet ray-curable epoxy resin may be suitably used. In other words, the surface layer 3 may also be a hard coat layer containing the ultraviolet ray-curable epoxy resin as a principal component. The ultraviolet ray-curable epoxy resin is exemplified by cured products of a bisphenol A epoxy resin, a glycidyl ether epoxy resin or the like. Owing to a small volumetric reduction rate during hardening, the ultraviolet ray-curable epoxy resin enables the occurrence of curling of the substrate layer 2 and the occurrence of cracking of the surface layer 3 to be accurately inhibited when the surface layer 3 is formed, whereby the surface layer 3 can be more easily and certainly formed. In addition, according to the glass plate substitute film 1, as a result of the principal component of the surface layer 3 being the ultraviolet ray-curable epoxy resin, the flexibility can be improved. Furthermore, when the ultraviolet ray-curable epoxy resin is used as the active energy ray-curable resin, it is preferred that other polymerizable monomer and polymerizable oligomer such as the (meth)acrylate monomer and (meth)acrylate oligomer are not contained. Accordingly, the flexibility of the surface layer 3 is further increased, whereby curved face-formability can be improved.

When the ultraviolet ray-curable resin is used as the active energy ray-curable resin, it is desired that an initiator for photopolymerization is added in an amount of about 0.1 to 5 parts by mass with respect to 100 parts by mass of the resin. The initiator for photopolymerization is not particularly limited, and for the polymerizable monomer and/or the polymerizable oligomer having a radical polymerizable unsaturated group in its molecule, examples of the initiator include benzophenone, benzyl, Michler's ketone, 2-chlorothioxanthone, 2,4-diethylthioxanthone, benzoin ethyl ether, benzoin isopropyl ether, benzoin isobutyl ether, 2,2-diethoxyacetophenone, benzyl dimethyl ketal, 2,2-dimethoxy-1,2-diphenylethan-1-one, 2-hydroxy-2-methyl-1-phenylpropane-1-one, 1-hydroxycyclohexyl phenyl ketone, 2-methyl-1-[4-(methylthio)phenyl]-2-morpholinopropanone-1,1-[4-(2-hydroxyethoxy)-phenyl]-2-hydroxy-2-methyl-1-propan-1-one, bis(cyclopentadienyl)-bis[2,6-difluoro-3-(pyrrol-1-yl)phenyl]titanium, 2-benzyl-2-dimethylamino-1-(4-morpholinophenyl)-butanone-1,2,4,6-trimethylbenzoyldiphenyl phosphine oxide, and the like. Moreover, for the polymerizable oligomer having a cation polymerizable functional group in its molecule, etc., examples of the initiator include aromatic sulfonium salts, aromatic diazonium salts, aromatic iodonium salts, metallocene compounds, benzoinsulfonic acid esters, and the like. It is to be noted that these compounds may be used each alone, or as a mixture of a plurality of the compounds.

Further, it is preferred that the surface layer 3 contains a filler for improving the scuff resistance. The filler is exemplified by an inorganic filler and an organic filler. The shape of the filler is not particularly limited, and may be for example, spherical, cubic, needle-like, rod-like, spindle, platy, flaky, fibrous or the like. Of these, the shape of the filler is preferably spherical.

Examples of the inorganic filler include silica, aluminum hydroxide, aluminum oxide, zinc oxide, barium sulfide, magnesium silicate, and the like. On the other hand, examples of the organic filler include an acrylic resin, an acrylonitrile resin, polyurethane, polyvinyl chloride, polystyrene, polyamide, polyacrylonitrile, and the like. In particular, the filler which may be contained in the surface layer 3 is preferably colloidal silica since the abrasion resistance is improved and the transparency is less likely to be impaired.

The lower limit of the mean particle diameter of the colloidal silica is preferably 5 nm, and more preferably 10 nm. On the other hand, the upper limit of the mean particle diameter of the colloidal silica is preferably 500 nm, more preferably 100 nm, and still more preferably 50 nm. When the mean particle diameter of the colloidal silica is less than the lower limit, the scuff resistance may not be sufficiently improved. To the contrary, when the mean particle diameter of the colloidal silica is greater than the upper limit, the transparency may be deteriorated. It is to be noted that the "mean particle diameter" as referred to means an average of the particle diameter of 30 particles randomly extracted from the particles observed by an electron microscope at ×1,000 magnification, and each particle diameter is defined in terms of a Feret's diameter (interval of parallel lines running along a given direction to sandwich each projection image).

The lower limit of the amount of the colloidal silica blended with respect to 100 parts by mass of the active energy ray-curable resin is preferably 1 part by mass, and more preferably 5 parts by mass. To the contrary, the upper limit of the amount of the colloidal silica blended with respect to 100 parts by mass of the active energy ray-curable resin is preferably 20 parts by mass, and more preferably 10 parts by mass. When the amount of the colloidal silica blended is less than the lower limit, the scuff resistance may not be sufficiently improved. To the contrary, when the amount of the colloidal silica blended is greater than the upper limit, the transparency may be deteriorated.

It is to be noted that the surface layer 3 may contain silicone in order to improve the slippability, and various types of additives such as an antioxidant, an antistatic agent, a fire retardant, heat stabilizer, an ultraviolet ray-absorbing agent, a fungicide, a plasticizer, a tackifier, and a reinforcing agent may be also contained.

Through overlaying the surface layer 3 on the outermost surface of one side, the glass plate substitute film 1 preferably has an increased hardness on the one side face. The lower limit of the pencil hardness of one side face of the glass plate substitute film 1 is preferably 5H, and more preferably 6H. When the pencil hardness of one side face of the glass plate substitute film 1 is less than the lower limit, the scratch-preventing property of one side of the substrate layer 2 is not sufficiently improved, whereby it may be difficult to use the glass plate substitute film 1 as a substitute for conventional glass plates. It is to be noted that the upper limit of the pencil hardness of one side face of the glass plate substitute film 1 is not particularly limited, but may be, for example 9H. In this regard, the "pencil hardness" as referred to means a value determined in conformity to JIS-K-5600 "scratch hardness (pencil method)".

In addition, the lower limit of the average thickness of the surface layer 3 is preferably 5 µm, and more preferably 10 µm in view of the aforementioned pencil hardness to be obtained. On the other hand, the upper limit of the average thickness of the surface layer 3 is preferably 50 µm, and more preferably 30 dm. When the average thickness of the surface layer 3 is less than the lower limit, the hardness of one side face of the glass plate substitute film 1 may not be sufficiently improved. To the contrary, when the average thickness of the surface layer 3 is greater than the upper limit, curling may occur resulting from the difference in elevation between the substrate layer 2 and the surface layer 3.

Production Method of Glass Plate Substitute Film

Next, a production method of the glass plate substitute film 1 will be described. The production method of the glass plate substitute film 1 includes the steps of: forming the substrate layer 2; and overlaying the surface layer 3 on one side of the substrate layer 2.

Substrate Layer-Forming Step

The substrate layer-forming step includes a procedure for forming a base film that composes the substrate layer 2 with an extrusion forming process by using a molten resin. The extrusion forming process in the procedure for forming the base film is exemplified by a melt extrusion forming process in which a material for forming the base film in a molten state is fed into a T die, and the forming material is extruded from the extruder and the T die, then the base film is formed by pressing with a pair of pressurizing roll.

The base film may be either an unstretched film or a stretched film. When the base film is stretched, either a monoaxially stretched film or a biaxially stretched film may be provided. When the biaxially stretched film is provided, either simultaneous biaxial stretching, or sequential biaxial stretching may be carried out. When biaxially stretched, the base film will have an improved mechanical strength, as well as an improved film performance.

The temperature in stretching carried out is preferably approximately to around the glass transition temperature of the thermoplastic resin composition which is a raw material of the film. Specifically, the stretching is carried out preferably at a temperature of (glass transition temperature−30° C.) or higher and (glass transition temperature+100° C.) or lower, and more preferably at a temperature of (glass transition temperature−20° C.) or higher and (glass transition temperature+80° C.) or lower. When the temperature in stretching is less than the lower limit, a sufficient draw ratio may not be obtained. To the contrary, when the temperature in stretching is greater than the upper limit, the resin will flow, whereby the stretching may not be stably conducted.

The lower limit of a draw ratio as defined by the area ratio is preferably 1.1 times, and more preferably 1.3 times. On the other hand, the upper limit of the draw ratio as defined by the area ratio is preferably 25 times, and more preferably 10 times. When the draw ratio is less than the lower limit, the toughness may not be sufficiently improved. To the contrary, when the draw ratio is greater than the upper limit, the effect comparable to the increase of the draw ratio may not be exerted.

The lower limit of the stretching rate (single direction) is preferably 10%/min, and more preferably 100%/min. On the other hand, the upper limit of the stretching rate (single direction) is preferably 20,000%/min, and more preferably 10,000%/min. When the stretching rate is less than the lower limit, a longer period of time is required for attaining a sufficient draw ratio, and thus a production cost may increase. To the contrary, when the stretching rate is greater than the upper limit, breaking of the stretched film, and the like, may occur. It is to be noted that in order to stabilize the optical isotropy and/or the dynamic characteristics of the base film, a heat treatment (annealing), etc., may be also carried out after the stretching treatment.

Furthermore, the substrate layer-forming step preferably includes a procedure for vapor deposition of an inorganic oxide on one face of the base film formed by extrusion forming in an attempt to effectively increase the hardness of the glass plate substitute film 1 on the side of the surface layer 3. Moreover, in order to improve e.g., the adhesiveness between the base film and the inorganic oxide or the surface layer 3, one face of the base film may be subjected to a surface treatment. Such a surface treatment is exemplified by (a) a corona discharge treatment, an ozone treatment, a low-temperature plasma treatment carried out using an oxygen gas, a nitrogen gas or the like, a glow discharge treatment, an oxidation treatment carried out using a chemical and/or the like, as well as (b) a primer coating treatment, an undercoat treatment, an anchor coating treatment, a vapor deposition anchor coating treatment and the like.

Surface Layer-Overlaying Step

The surface Layer-overlaying step is not particularly limited as long as it involves a method capable of overlaying the surface layer 3 using the curable resin composition. For example, a coating method may be carried out in which a coating liquid containing the curable composition is applied on one side face of the substrate layer 2, and then the coating film is cured.

Furthermore, the coating liquid may contain a solvent for improving the coating properties. Examples of such a solvent include organic solvents, e.g., aliphatic hydrocarbons such as hexane and octane; aromatic hydrocarbons such as toluene and xylene; alcohols such as ethanol, 1-propanol, isopropanol and 1-butanol; ketones such as methyl ethyl ketone and methyl isobutyl ketone; esters such as ethyl acetate, butyl acetate and isobutyl acetate; glycol ethers such as ethylene glycol monomethyl ether, ethylene glycol monoethyl ether, diethylene glycol monoethyl ether, propylene glycol monomethyl ether and propylene glycol monoethyl ether; and esterified glycol ethers such as ethylene glycol monomethyl ether acetate and propylene glycol monomethyl ether acetate. These organic solvents may be used either alone, or as a mixture of several types thereof as needed. It is to be noted that such a solvent is preferably evaporated to dryness in the course of the production of the surface layer 3. Therefore, the boiling point of the solvent is preferably about no less than 60° C. and no greater than 160° C.

The application method of the curable resin composition is not particularly limited as long as the curable resin composition can be evenly coated on one side face of the substrate layer 2. For example, a spin coating method, a spray coating method, a slide coating method, a dip coating method, a bar coating method, a roll coating method, a screen printing method and the like may be exemplified.

The drying method of the coating film is not particularly limited, and for example, drying by heating, drying under reduced pressure, and the like may be exemplified. In addition, the drying temperature may be, for example, about no less than 30° C. and no greater than 150° C.

When the curable resin composition is an active energy ray-curable resin, the curing method of the coating film may involve irradiation with an ultraviolet ray, visible light, an electron beam, an ionizing radiation or the like, and of these, irradiation with an ultraviolet ray is preferred. It is to be noted that when the surface layer 3 is provided, a surface modification treatment as a pretreatment, such as a plasma treatment in an atmosphere of an inert gas such as an argon gas or a nitrogen gas may be carried out as needed.

Benefit

In the glass plate substitute film 1, since the substrate layer 2 contains as a principal component the polycarbonate having a constitutional unit derived from a dihydroxy compound represented by the above formula (1), reduction in weight can be achieved when used in place of a conventional glass plate. In addition, since the substrate layer 2 contains a certain polycarbonate as a principal component in the glass plate substitute film 1 as described above, superior impact resistance is achieved, and therefore, breakage upon application of the impact is less likely to occur as compared with conventional glass plates. Therefore, according to the glass plate substitute film 1, a necessity for pasting the protection film in order to prevent the breakage as executed on the surface of conventional glass plates can be obviated, whereby an inconvenience such as generation of bubbles between the glass plate substitute film 1 and a protection film can be precluded when the protection film is attached. In addition, according to the glass plate substitute film 1, since the surface layer 3 is overlaid on one side of the substrate layer 2, the surface layer 3 can protect the substrate layer 2 from being scratched.

In addition, the principal component of the substrate layer 2 is the polycarbonate having a constitutional unit derived from a dihydroxy compound represented by the above formula (1), and the dihydroxy compound is the extract of a plant or the derivative thereof in the glass plate substitute film 1; therefore, blooming resistance and/or yellowing resistance against ultraviolet rays can be improved to enable the transparency to be maintained, as compared with films originated from a petroleum resource. Thus, the glass plate substitute film 1 is superior in substitutability for a glass plate. Furthermore, the glass plate substitute film 1 can improve solvent resistance, resistance to sunscreen, flame retardance and the like as compared with films originated from a petroleum resource. Moreover, although incineration of the film originated from a petroleum resource may lead to environmental destruction and thus requires a complicated disposal procedure, the present glass plate substitute film 1 can be easily disposed since the dihydroxy compound is an extract of a plant or a derivative thereof.

Since the glass plate substitute film 1 is formed using a synthetic resin as a principal component, even if breaking or the like occurs, a large number of fragments are less likely to be generated as in the case of conventional glass plates. Thus, the glass plate substitute film 1 can prevent fingers and the like from being injured by the fragments generated upon breakage.

Second Embodiment

The glass plate substitute film 11 shown in FIG. 2 includes a substrate layer 4, and the surface layer 3 overlaid on one side of the substrate layer 4 similarly to the first embodiment. The glass plate substitute film 11 shown in FIG. 2 is formed as a two-layer structure composed of the substrate layer 4 and the surface layer 3. Since the surface layer 3 is similar to that in the glass plate substitute film 1 shown in FIG. 1, the description is omitted through designating with the identical reference number. In addition, the average thickness and the pencil hardness of one side face of the glass plate substitute film 11 are similar to those of the glass plate substitute film 1 shown in FIG. 1. The glass plate substitute film 1 shown in FIG. 2 is transparent. The glass plate substitute film 11 shown in FIG. 2 is flexible. The glass plate substitute film 11 shown in FIG. 2 is used as a substitute for conventional glass plates.

Substrate Layer

The substrate layer 4 is formed using a forming material similar to that of the substrate layer 2 in the glass plate substitute film 1 shown in FIG. 1. Specific constitution of the substrate layer 4' is similar to that of the substrate layer 2 in the glass plate substitute film 1 shown in FIG. 1, except that one side face (i.e., the face on which the surface layer 3 is overlaid) has a wavy and fine modulated structure. The fine modulated structure is formed over the entire surface of the one side face of the substrate layer 4. Due to having the fine modulated structure on one side face of the substrate layer 4, while visibility of the image is maintained, the contact area of the substrate layer 4 with the surface layer 3 overlaid on one side of this substrate layer 4 is increased, whereby the adhesion strength of the substrate layer 4 to the surface layer 3 overlaid on one side of the this substrate layer 4 can be improved. It is to be noted that the "fine modulated structure" as referred to means a structure having fine undulations along one direction. Furthermore, the undulations may not be necessarily regular as long as ridge lines and valley lines are alternately provided continuously along one direction, and may include, for example, a shape in which partially protruded or caved portion may be present between the ridge line and the valley line.

The lower limit of the spacing p between ridge lines in the fine modulated structure is preferably 1 mm, more preferably 10 mm, and still more preferably 20 mm. On the other hand, the upper limit of the spacing p between ridge lines in the fine modulated structure is preferably 500 mm, more preferably 100 mm, and still more preferably 60 mm. When the spacing p between ridge lines is less than the lower limit, rays of light are condensed or diffused due to the fine modulated structure, and therefore visibility of the image may be deteriorated. To the contrary, when the spacing p between ridge lines is greater than the upper limit, the surface area on one side face of the substrate layer 4 cannot be sufficiently large, whereby the adhesion strength between the substrate layer 4 and the surface layer 3 may not be sufficiently enhanced. It is to be noted that all the spacings p between ridge lines in the fine modulated structure preferably fall within the above range; however, a part of a plurality of spacings p between ridge lines in the fine modulated structure may not fall within the above range, and in this instance, it is preferred that no less than 50%, and preferably no less than 70% spacings between ridge lines among the plurality of spacings between ridge lines fall within the above range.

Additionally, the lower limit of the average height h of the ridge lines based on an approximate virtual face spread along a plurality of valley lines in the fine modulated structure is preferably 5 μm, more preferably 7 μm, and still more preferably 9 μm. On the other hand, the upper limit of the average height h of the ridge lines based on the approximate virtual face spread along a plurality of valley lines in the fine modulated structure is preferably 40 µm, more preferably 20 µm, and still more preferably 15 µm. When the average height h is less than the lower limit, the surface area on one side face of the substrate layer 4 cannot be sufficiently large, whereby the adhesion strength between the substrate layer 4 and the surface layer 3 may not be sufficiently enhanced. To the contrary, when the average height h is greater than the upper limit, the rays of light are condensed or diffused due to the fine modulated structure, and therefore visibility of the image may be deteriorated.

Production Method of Glass Plate Substitute Film

Next, a production method of the glass plate substitute film 11 will be described. The production method of the glass plate substitute film 11 includes the steps of: forming the substrate layer 4; and overlaying the surface layer 3 on one side of the substrate layer 4. It is to be noted that since the surface layer-overlaying step is similar to the surface layer-overlaying step of the glass plate substitute film 1 shown in FIG. 1, the description is omitted.

Substrate Layer-Forming Step

The substrate layer-forming step is carried out with an extrusion forming process. In the substrate layer-forming step, a die with a lip opening having a certain cross-sectional shape is used. In other words, by using the lip opening having a cross-sectional shape that matches the reversal shape of the fine modulated structure, the wavy and fine modulated structure is formed on one side face of the base film 4a as shown in FIG. 3. It is to be noted that the base film 4a may be either an unstretched film or a stretched film similarly to the base film of the glass plate substitute film 1 shown in FIG. 1, but the base film accompanied by less deformation than the base film of the glass plate substitute film 1 shown in FIG. 1 upon stretching may be suitably used such that the fine modulated structure can be suitably formed. Additionally, the temperature, the draw ratio, the stretching rate and the like in carrying out the stretching may be similar to those in the substrate layer-forming step of the glass plate substitute film 1 shown in FIG. 1. Furthermore, in order to effectively increase the hardness on the side of the surface layer 3 of the glass plate substitute film 11, one side face of the base film 4a is preferably subjected to vapor deposition of the inorganic oxide.

Benefit

The glass plate substitute film 11 has, similarly to the glass plate substitute film 1 shown in FIG. 1, superior impact resistance and light weight compared with conventional glass plates, as well as superior substitutability for conventional glass plates due to having sufficient scratch-preventing property, blooming resistance and yellowing resistance.

Third Embodiment

The glass plate substitute film 21 shown in FIG. 4 includes the substrate layer 2, a surface layer 5 overlaid on one side of the substrate layer 2, and an adhesion layer 6 provided between the substrate layer 2 and the surface layer 5, whereby the substrate layer 2 and the surface layer 5 are adhered via the adhesion layer 6. The glass plate substitute film 21 shown in FIG. 4 is formed as a three-layer structure including the substrate layer 2, the surface layer 5 and the adhesion layer 6. Since the substrate layer 2 is similar to that in the glass plate substitute film shown in FIG. 1 or FIG. 2, the description is omitted through designating with the identical reference number. In addition, the pencil hardness of one side face of the glass plate substitute film 21 is similar to that of the glass plate substitute film shown in FIG. 1 or FIG. 2. The glass plate substitute film 21 shown in FIG. 4 is transparent. The glass plate substitute film 21 shown in FIG. 4 is flexible. The glass plate substitute film 21 shown in FIG. 4 is used as a substitute for conventional glass plates.

Surface Layer

The surface layer 5 is formed from a glass film mainly composed of glass. The glass film may include, for example, soda-lime glass, non-alkali glass, or the like.

The lower limit of the average thickness of the surface layer 5 composed of the glass film is preferably 5 µm, more preferably 10 µm, and still more preferably 15 µm. On the other hand, the upper limit of the average thickness of the surface layer 5 is preferably 300 µm, more preferably 200 µm, and still more preferably 100 µm. When the average thickness of the surface layer 5 is less than the lower limit, the surface layer 5 may be likely to be detached. To the contrary, when the average thickness of the surface layer 5 is greater than the upper limit, the reduction in weight of the glass plate substitute film 21 may not be sufficiently improved.

Adhesion Layer

The adhesion layer 6 is formed from an adhesive (i.e., tacky material). The adhesive is not particularly limited, and is exemplified by an acrylic adhesive, synthetic rubber-based adhesives such as an acryl-rubber-based adhesive, a natural rubber-based adhesive and a butyl rubber-based adhesive, a silicone-based adhesive, a polyurethane-based adhesive, an epoxy-based adhesive, a polyethylene-based adhesive, a polyester-based adhesive, and the like. Of these, an acrylic adhesive is preferred owing to well harmonized adhesive force, holding power and tack strength, as well as availability at a low cost.

The monomer that constitutes the acrylic adhesive is not particularly limited, and examples of the monomer include: acrylic acid alkyl esters and methacrylic acid alkyl esters (the alkyl group having 1 to 20 carbon atoms, for example) such as methyl acrylate, ethyl acrylate, n-butyl acrylate, methyl methacrylate, isobutyl acrylate, t-butyl acrylate, n-octyl acrylate, isooctyl acrylate, 2-ethylhexyl acrylate, isononyl acrylate, ethyl methacrylate, n-butyl acrylate, isobutyl methacrylate and 2-ethylhexyl methacrylate; acrylic acid hydroxyalkyl esters and methacrylic acid hydroxyalkyl esters (the hydroxyalkyl group having 1 to 20 carbon atoms, for example) such as 2-hydroxyethyl acrylate, 2-hydroxypropyl acrylate, 4-hydroxybutyl acrylate, 2-hydroxyethyl methacrylate, 2-hydroxypropyl methacrylate and 4-hydroxybutyl methacrylate; unsaturated aliphatic carboxylic acids such as acrylic acid, methacrylic acid, maleic acid, fumaric acid and itaconic acid; vinyl acetate; any combination thereof; and the like. Among these, n-butyl acrylate or 2-ethylhexyl acrylate is particularly preferably used as the monomer owing to favorable adhesion characteristics such as the adhesive force, the holding power and the tack strength.

Alternatively, as the adhesive, a solvent type adhesive may be used since the thickness can be easily adjusted. It is to be noted that other adhesive such as an emulsion type adhesive or a hot melt type adhesive may be adopted as the adhesive.

The solvent type adhesive is produced by dissolving the material in an organic solvent. Examples of the organic solvent which may be used include toluene, ethyl acetate and the like. In the case of the acrylic adhesive, the monomer is dissolved in the organic solvent such as toluene or ethyl acetate, and then the solvent type acrylic adhesive may be produced through polymerization using a polymerization initiator. Accordingly, the adhesive containing a desired component can be readily produced while the benefit of the acrylic adhesive is achieved, and the thickness of the adhesion layer 6 can be easily adjusted.

Alternatively, as the adhesive, an adhesive containing a thermosetting component may be also adopted. The adhesive containing a thermosetting component is not particularly limited, and a thermosetting rubber-based adhesive, a thermosetting silicone-based adhesive, a thermosetting acrylic adhesive or the like may be used. To these adhesives may be blended as the thermosetting component, an epoxy resin, an unsaturated polyester resin, a phenol resin, and/or the like. Moreover, as the thermosetting acrylic adhesive, a heat curable pressure-sensitive adhesive, specifically, e.g., a (meth)acrylate alkyl ester polymer subjected to a crosslinking treatment by adding an epoxy-based crosslinking agent, etc., disclosed in Japanese Unexamined Patent Application, Publication No. H10-292163, and the like may be also used.

The lower limit of the average thickness of the adhesion layer 6 is preferably 5 μm, and more preferably 10 μm. On the other hand, the upper limit of the average thickness of the adhesion layer 6 is preferably 300 μm, more preferably 100 μm, and still more preferably 50 μm. When the average thickness of the adhesion layer 6 is less than the lower limit, the substrate layer 2 and the surface layer 5 may not be accurately adhered. To the contrary, when the average thickness of the adhesion layer 6 is greater than the upper limit, demands for reduction in thickness of the glass plate substitute film 21 may not be satisfied.

Production Method of Glass Plate Substitute Film

Next, a production method of the glass plate substitute film 21 will be described. The production method of the glass plate substitute film 21 includes the steps of: forming the substrate layer 2; overlaying the adhesion layer 6 on one side of the substrate layer 2; and pasting the surface layer 5 to one side of the adhesion layer 6. It is to be noted that the substrate layer-forming step may be similar to the substrate layer-forming step of the glass plate substitute film 1 shown in FIG. 1.

Alternatively, in the production method of the glass plate substitute film 21, for example, a long strip-shaped laminate having the substrate layer 2, the adhesion layer 6 overlaid on one side of the substrate layer 2, and a release layer overlaid on one side of the adhesion layer 6 may be used. In the production method carried out using such a laminate, the laminate is wound around one roll and fed from one side along the longitudinal direction, whereas a long strip-shaped surface layer 5 is fed from other roll, and the surface layer 5 is pasted to one side of the adhesion layer 6 of the laminate while the release layer is detached.

Benefit

According to the glass plate substitute film 21, while the impact resistance becomes superior compared with conventional glass plates as described above, scuff resistance comparable to conventional glass can be attained since the surface layer 5 is mainly composed of glass.

Additionally, according to the glass plate substitute film 21, a necessity for pasting the protection film in order to prevent the breakage as executed on the surface of conventional glass plates can be obviated, whereby an inconvenience such as generation of bubbles between the glass plate substitute film 21 and a protection film can be precluded when the protection film is attached. Furthermore, owing to the surface layer 5 mainly composed of glass in the glass plate substitute film 21, the texture/quality approximate to conventional glass plates can be realized. Moreover, since the surface layer 5 is attached to one side of the adhesion layer 6 in the glass plate substitute film 21, even in the case in which a strong impact is given to one face, scattering of glass fragments can be prevented by the adhesion layer 6. Therefore, the glass plate substitute film 21 can improve the safety in the case in which the glass is broken.

Fourth Embodiment

Glass Plate Substitute Film

The glass plate substitute film 31 shown in FIG. 5 includes a substrate layer 7, a surface layer 8 overlaid on one side of the substrate layer 7, and an electrically conductive layer 9 provided between the substrate layer 7 and the surface layer 8. The glass plate substitute film 31 shown in FIG. 5 is formed as a three-layer structure including the substrate layer 7, the electrically conductive layer 9 and the surface layer 8 overlaid in this order. The average thickness of the glass plate substitute film 31 is similar to those of the glass plate substitute films shown in FIGS. 1 and 2. In addition, the pencil hardness of one side face is similar to those of the glass plate substitute films shown in FIGS. 1, 2 and 4. The glass plate substitute film 31 shown in FIG. 5 is transparent. The glass plate substitute film 31 shown in FIG. 5 is flexible. The glass plate substitute film 31 shown in FIG. 5 is used as a substitute for conventional glass plates.

Substrate Layer

The substrate layer 7 has a similar constitution to the substrate layer 2 of the glass plate substitute film 1 shown in FIG. 1. However, in the glass plate substitute film 31, the substrate layer 7 is free from the inorganic oxide vapor-deposited on one side face.

Surface Layer

The surface layer 8 has a similar constitution to the surface layer 3 of the glass plate substitute film 1 shown in FIG. 1. However, in the glass plate substitute film 31, the surface layer 8 is provided as a hard coat layer from an ultraviolet ray-curable epoxy resin included as a principal component.

Electrically Conductive Layer

The electrically conductive layer 9 improves the antistatic property. The electrically conductive layer 9 is transparent and electrically conductive. In addition, the electrically conductive layer 9 is flexible. The electrically conductive layer 9 contains an electrically conductive inorganic material as a principal component. Specifically, the electrically conductive layer 9 contains electrically conductive inorganic particles and a binder therefor, the electrically conductive inorganic particles being included as a principal component.

The electrically conductive inorganic particles are not particularly limited as long as they are transparent and electrically conductive, and exemplified by metal particles, carbon particles, electrically conductive metal oxide particles, electrically conductive nitride particles, and the like. Of these, electrically conductive metal oxide particles having both transparency and electrical conductivity are preferred. Furthermore, examples of the electrically conductive metal oxide particles include metal oxide particles such as tin oxide particles, antimony-containing tin oxide (ATO) particles, tin-containing indium oxide (ITO) particles, aluminum-containing zinc oxide (AZO) particles and gallium-containing zinc oxide (GZO) particles. Furthermore, as the electrically conductive inorganic particles, oxide sols such as a tin oxide sol and an oxidized alumina sol are also preferred.

The lower limit of the mean particle diameter of the electrically conductive inorganic particles is preferably 1 nm, more preferably 5 nm, and still more preferably 10 nm. On the other hand, the upper limit of the mean particle diameter of the electrically conductive inorganic particles is preferably 300 nm, more preferably 150 nm, and still more preferably 100 nm. When the mean particle diameter of the electrically conductive inorganic particles is less than the lower limit, easy production may be impossible. To the contrary, when the mean particle diameter of the electrically conductive inorganic particle is greater than the upper limit, the haze value may be too high.

In addition, the electrically conductive inorganic particle may be subjected to a surface treatment with an inorganic compound or an organic compound. The inorganic compound which may be used in the surface treatment is exemplified by alumina or silica. The organic compound which may be used in the surface treatment is exemplified by polyol, alkanolamine, stearic acid, a silane coupling agent, a titanate coupling agent, or the like.

The lower limit of the content of the electrically conductive inorganic particles in the electrically conductive layer 9 is preferably 50% by mass, more preferably 55% by mass, and still more preferably 60% by mass. On the other hand, the upper limit of the content of the electrically conductive inorganic particles in the electrically conductive layer 9 is preferably 90% by mass, more preferably 85% by mass, and still more preferably 80% by mass. When the content of the electrically conductive inorganic particles is less than the lower limit, the antistatic property of the glass plate substitute film 31 may not be sufficiently improved. To the contrary, when the content of the electrically conductive inorganic particles is greater than the upper limit, the electrically conductive inorganic particles may not be accurately fixed.

The binder is not particularly limited as long as it is transparent and enables the electrically conductive layer 9 to be formed in which the electrically conductive inorganic particles are dispersed. Examples of the binder include synthetic resins such as an acrylic resin, a polyester, a polyamide, a polycarbonate, a polyurethane, a polystyrene, a polyvinyl chloride, a polyvinylidene chloride, a polyvinyl alcohol and a polyvinyl acetate.

The lower limit of the average thickness of the electrically conductive layer 9 is preferably 100 nm, more preferably 300 nm, and still more preferably 500 nm. On the other hand, the upper limit of the average thickness of the electrically conductive layer 9 is preferably 3 µm, more preferably 2 µm, and still more preferably 1 µm. When the average thickness of the electrically conductive layer 9 is less than the lower limit, the antistatic property of the glass plate substitute film 31 may not be sufficiently improved. To the contrary, when the average thickness of the electrically conductive layer 9 is greater than the upper limit, demands for reduction in thickness of the glass plate substitute film 31 may not be satisfied, and the flexibility may be impaired.

The surface resistance value of the electrically conductive layer 9 is preferably no less than $10 \times 10^7$ and no greater than $10 \times 10^9$. When the surface resistance value of the electrically conductive layer 9 falls within the above range, an antistatic property sufficient for inhibiting the adherence of dust and the like can be obtained.

Production Method of Glass Plate Substitute Film

Next, a production method of the glass plate substitute film 31 will be described. The production method of the glass plate substitute film 31 includes the steps of: forming the substrate layer 7; overlaying the electrically conductive layer 9 on one side of the substrate layer 7; and overlaying the surface layer 8 on one side of the electrically conductive layer 9. It is to be noted that since the substrate layer-forming step and the surface layer-overlaying step are similar to the substrate layer-forming step and the surface layer-overlaying step of the glass plate substitute film 1 shown in FIG. 1, the description of them is omitted.

Electrically Conductive Layer-Overlaying Step

The electrically conductive layer-overlaying step may be carried out by a coating method in which a coating liquid containing: the electrically conductive inorganic particles for forming the electrically conductive layer 9; a binder; and a solvent is applied, and the coating film is dried to permit curing.

The solvent which may be contained in the coating liquid is exemplified by solvents similar to those which may be used in the surface layer-overlaying step of the glass plate substitute film 1 shown in FIG. 1.

In addition, the application method of the coating liquid is not particularly limited as long as the coating liquid can be evenly coated on one side face of the substrate layer 7. For example, a solvent coating method such as a bar coating method, a blade coating method, an air knife coating method, a gravure coating method, a roll coating method as well as a screen printing method and the like may be exemplified.

Benefit

Since the glass plate substitute film 31 includes the electrically conductive layer 9 provided between the surface layer 8 and the substrate layer 7, the antistatic property can be improved. Thus, the glass plate substitute film 31 can inhibit the adherence of dust and the like when used, for example, for the front plate of display devices.

Since the surface layer 8 in the glass plate substitute film 31 contains the ultraviolet ray-curable epoxy resin as a principal component, the occurrence of curling, cracking and the like is prevented, and also the flexibility is improved, leading to a significant improvement of the curved face-formability. Thus, the glass plate substitute film 31 can be suitably used for a curved face display device which is designed to be curved toward the viewer from the center to each the left and right along the horizontal direction such that the distances between the viewer and the display device are substantially constant among the central portion and peripheral portions of the display device, for the purpose of augmenting the presence, for example.

Fifth Embodiment

The glass plate substitute film 26 shown in FIG. 6 includes a substrate layer 2, a pair of surface layers 3 overlaid on both two sides of the substrate layer 2. The glass plate substitute film 26 shown in FIG. 6 is formed as a three-layer structure including the substrate layer 2, and the pair of the surface layers 3. Since the substrate layer 2 and the surface layer 3 are similar to those in the glass plate substitute film 1 shown in FIG. 1, the description is omitted through designating with the identical reference number. In addition, the average thickness of the glass plate substitute film 26 is similar to that of the glass plate substitute film 1 shown in FIG. 1. Moreover, the pencil hardness of two both side faces of the glass plate substitute film 26 is similar to that of the one side face of the glass plate substitute film 1 shown in FIG. 1. The glass plate substitute film 26 shown in FIG. 6 is transparent. The glass plate substitute film 26 shown in FIG. 6 is flexible. The glass plate substitute film 26 shown in FIG. 6 is used as a substitute for conventional glass plates.

Production Method of Glass Plate Substitute Film

The production method of the glass plate substitute film 26 includes the steps of: forming the substrate layer 2; and overlaying the pair of surface layers 3 on both two sides of the substrate layer 2. The substrate layer-forming step may be similar to the substrate layer-forming step for the glass plate substitute film 1 shown in FIG. 1. In addition, the surface layer-overlaying step may be similar to the surface layer-overlaying step for the glass plate substitute film 1 shown in FIG. 1 except that the surface layer 3 is overlaid on in addition to one side of the substrate layer 2, also on other side of the substrate layer 2.

Benefit

Similarly to the glass plate substitute film 1 shown in FIG. 1, the glass plate substitute film 26 is superior in the impact resistance, lightweight properties and the like as compared with the conventional glass plates. In addition, since the glass plate substitute film 26 has the pair of surface layers 3 overlaid on both two sides of the substrate layer 2, the other side of the substrate layer 2 can be prevented from being scratched, in addition to the one side of the substrate layer 2.

Sixth Embodiment

Panel Laminate for Display Device

The panel laminate 41 for a display device shown in FIG. 7 includes a front plate 1 composed of the glass plate substitute film 1, a touchscreen 42 provided on the back face side of the front plate 1, and a display panel 43 overlaid on the back face side of the touchscreen 42. It is to be noted that the "front plate" as referred to means a plate member provided on the outermost surface (viewer side) of the display device.

Benefit

Since the glass plate substitute film 1 is used as the front plate of the display device, the impact resistance and lightweight properties of the front plate 1 are improved as compared with conventional glass plates, and the scratch-preventing property, blooming resistance and yellowing resistance of the front plate 1 can be improved.

Since the panel laminate 41 for a display device includes the glass plate substitute film 1 as the front plate 1, the impact resistance and lightweight properties of the front plate 1 are improved as compared with conventional glass plates, and the scratch-preventing property, blooming resistance and yellowing resistance of the front plate 1 can be improved. In addition, according to the panel laminate 41 for a display device, a necessity for separately pasting the protection film to the surface thereof in order to prevent the breakage can be obviated, whereby an inconvenience such as generation of bubbles between the front plate and the protection film can be precluded when the protection film is attached.

Seventh Embodiment

Display Device

The display device 51 shown in FIG. 8 includes a panel laminate 41 for a display device, and a backlight unit 52 provided on the back face side of the panel laminate 41 for a display device. Since the panel laminate 41 for a display device is similar to the panel laminate 41 for a display device shown in FIG. 7, the description is omitted through designating with the identical reference number.

Backlight Unit

The backlight unit 52 includes an optical waveguide plate 53, a light source 54 provided along the end face of the optical waveguide plate 53, and one or a plurality of optical sheet(s) 55 provided on the front face side of the optical waveguide plate 53. The light source 54 is exemplified by a plurality of LEDs, cold-cathode tubes, and the like. Further, the optical sheet 55 is exemplified by a light diffusion sheet, a micro lens sheet, a prism sheet and the like, which may be repeatedly overlaid in combination as needed.

Benefit

Since the display device 51 includes the glass plate substitute film 1 as the front plate 1, the impact resistance and lightweight properties of the front plate 1 are improved as compared with conventional glass plates, and the scratch-preventing property, blooming resistance and yellowing resistance of the front plate 1 can be improved. In addition, according to the display device 51, a necessity for separately pasting the protection film to the surface thereof in order to prevent the breakage can be obviated, whereby an inconvenience such as generation of bubbles between the front plate and the protection film can be precluded when the protection film is attached.

Other Embodiment

It is to be noted that the glass plate substitute film and the display device of the present invention can be put into practice according to modes with various modifications/alterations and improvements, in addition to the embodiments described above. For example, the glass plate substitute film may be composed of each layer (i.e., substrate layer, surface layer, electrically conductive layer and adhesion layer) described in the aforementioned first to fifth embodiments which may be combined ad libitum. Moreover, the glass plate substitute film may include in addition to the aforementioned each layer, other layer such as an antireflection layer.

In the glass plate substitute film, when the pair of surface layers are overlaid on both two sides of the substrate layer, constitution of each surface layer may not be necessarily identical. In the glass plate substitute film, when the pair of surface layers are overlaid on both two sides of the substrate layer, for example, one surface layer may be a hard coat layer containing an active energy ray-curable resin as a principal component, whereas other surface layer may be a glass film mainly composed of glass. Furthermore, in the glass plate substitute film, the electrically conductive layer may be provided between the substrate layer and either one of the surface layers, or the electrically conductive layer may be each provided between the substrate layer and the pair of surface layers.

In the glass plate substitute film, the plurality of surface layers may be overlaid on one side or both two sides of the substrate layer. For example, as shown in FIG. 9, the glass plate substitute film 35 may have a substrate layer 36, a first surface layer 37 overlaid on one side of the substrate layer 36, and a second surface layer 38 overlaid on one side of the first surface layer 37. Moreover, in this case, it is preferred that materials for forming the first surface layer 37 and the second surface layer 38 are different. More specifically, for example, either one of the first surface layer 37 and the second surface layer 38 may be a hard coat layer containing an active energy ray-curable resin as a principal component, whereas the other surface layer of the first surface layer 37 and the second surface layer 38 may be a glass film, or the first surface layer 37 and the second surface layer 38 may be a hard coat layer containing each distinct resin as a principal component. Still further, when the first surface layer 37 and the second surface layer 38 are both a hard coat layer, the pencil hardness of the first surface layer 37 is preferably less than the pencil hardness of the second surface layer 38.

According to the glass plate substitute film 35, when the pencil hardness of the first surface layer 37 thus provided in the vicinity of the substrate layer 36 is small, occurrence of curling can be inhibited.

Also when the glass plate substitute film includes the electrically conductive layer provided between the substrate layer and the surface layer, an inorganic oxide may be vapor-deposited on the side of the substrate layer where the electrically conductive layer is overlaid, or the surface layer may be a hard coat layer or a glass film provided from a principal component other than the ultraviolet ray-curable epoxy resin. Also when the glass plate substitute film has such a constitution, superior impact resistance and light weight compared with glass plates, as well as sufficient scratch-preventing property and the like can be exhibited.

The substrate layer may also have a wavy and fine modulated structure on the surface layer composed of the glass film, the overlaying face with the adhesion layer or the electrically conductive layer, etc. Also when the glass plate substitute film has such a constitution, the adhesion strength of the substrate layer to the layer overlaid on the substrate layer can be enhanced. Alternatively, the glass plate substitute film may have the wavy and fine modulated structure on both two side faces of the substrate layer. According to such a constitution, the glass plate substitute film enables the adhesion strength between the substrate layer and the layer overlaid on both two sides of the substrate layer to be enhanced through increasing the surface area of the both two sides of the substrate layer.

The substrate layer may not be necessarily formed by using the extrusion forming process, and for example, a solution casting process, a calendar process, or a compression forming process may be employed for the formation.

The panel laminate for a display device and the display device may not necessarily have a touchscreen. Even when the panel laminate for a display device and a display device do not include the touchscreen, the impact resistance and lightweight properties of the front plate are improved as compared with conventional glass plates, and the scratch-preventing property, blooming resistance and yellowing resistance of the front plate can be improved by including the glass plate substitute film. Additionally, the glass plate substitute film may not be necessarily used as the front plate of the display device, and can be used as a variety of members that substitute for conventional glass plates.

As described in the foregoing, the glass plate substitute film according to the embodiment of the present invention has superior substitutability for glass plates due to having superior impact resistance and light weight compared with glass plates, as well as sufficient scratch-preventing property, blooming resistance and yellowing resistance, and thus can be suitably used for a front plate of display devices.

EXPLANATION OF THE REFERENCE SYMBOLS

1, 11, 21, 26, 31, 35 glass plate substitute film
2, 4, 7, 36 substrate layer
3, 5, 8, 37, 38 surface layer
4a base film
6 adhesion layer
9 electrically conductive layer
41 panel laminate for a display device
42 touchscreen
43 display panel
51 display device
52 backlight unit
53 optical waveguide plate
54 light source
55 optical sheet

The invention claimed is:

1. A glass plate substitute film comprising:
a substrate layer; and
one or a plurality of surface layers overlaid on one side or both two sides of the substrate layer,
wherein the substrate layer comprises as a principal component a polycarbonate comprising a constitutional unit derived from a dihydroxy compound represented by formula (1):

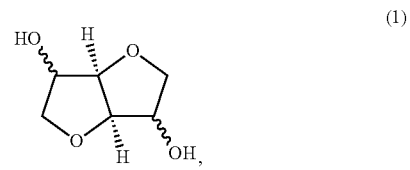

and wherein
the dihydroxy compound is an extract of a plant or a derivative thereof,
the one or a plurality of surface layers comprise an active energy ray-curable resin as a principal component,
the glass plate substitute film is to be used in place of a glass plate, and an average thickness of the substrate layer is no less than 100 μm and no greater than 1,000 μm, and
the substrate layer comprises a wavy and fine modulated structure having fine undulations along one direction, on one side face or both two side faces.

2. The glass plate substitute film according to claim 1, wherein the active energy ray-curable resin is an ultraviolet ray-curable epoxy resin.

3. The glass plate substitute film according to claim 1, wherein the polycarbonate further comprises a constitutional unit derived from an aliphatic dihydroxy compound other than the dihydroxy compound represented by the formula (1).

4. The glass plate substitute film according to claim 1, further comprising an electrically conductive layer which is provided between the substrate layer and the at least one surface layer of the one or the plurality of surface layers, and comprises an electrically conductive inorganic material as a principal component.

5. The glass plate substitute film according to claim 1, which is for use as a front plate of a display device.

6. A display device comprising the glass plate substitute film according to claim 5.

* * * * *